Oct. 23, 1934.                H. SINCLAIR                1,978,172
POWER TRANSMISSION SYSTEM
Filed Sept. 19, 1931        4 Sheets-Sheet 1

Oct. 23, 1934.  H. SINCLAIR  1,978,172
POWER TRANSMISSION SYSTEM
Filed Sept. 19, 1931  4 Sheets-Sheet 3

INVENTOR
*Harold Sinclair*
BY
*Dean Fairbank Hirsch & Foster*
ATTORNEYS

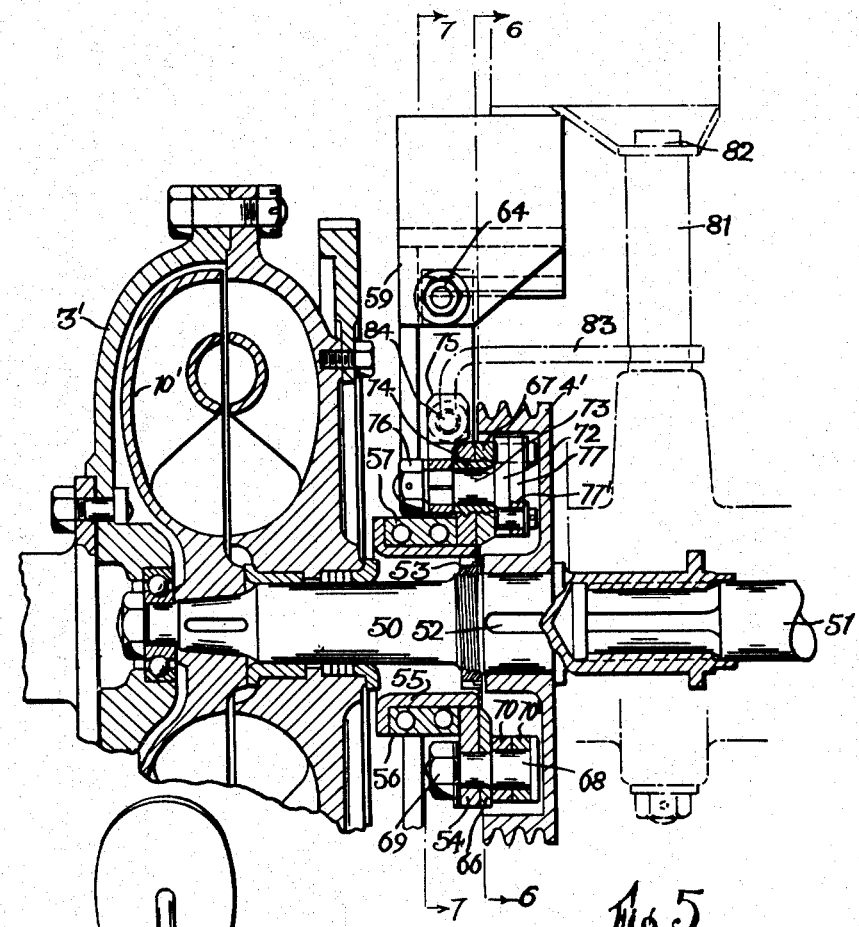
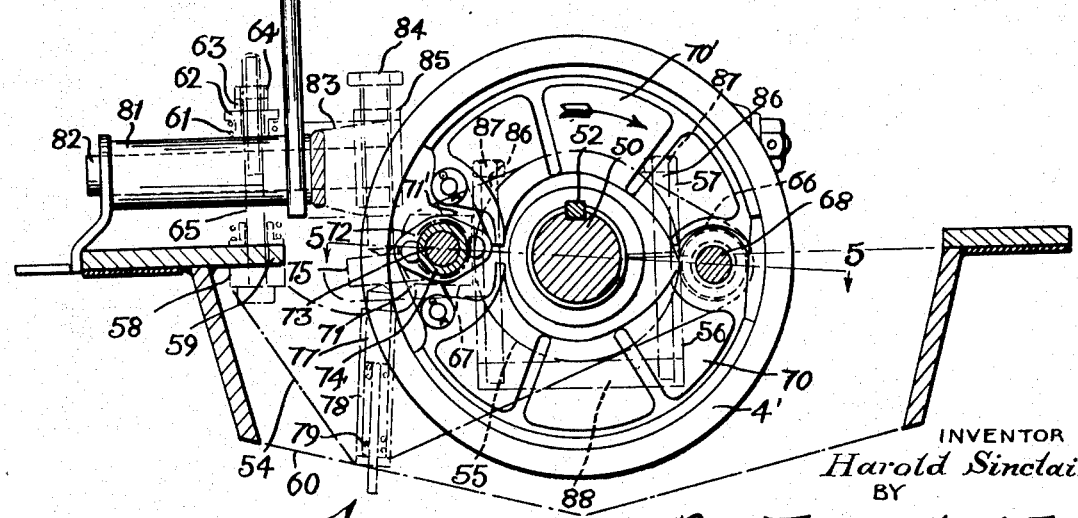

Patented Oct. 23, 1934

1,978,172

UNITED STATES PATENT OFFICE 1,978,172

POWER TRANSMISSION SYSTEM

Harold Sinclair, Surbiton Hill, England

Application September 19, 1931, Serial No. 563,789
In Great Britain September 25, 1930

19 Claims. (Cl. 192—12)

The present invention relates to power transmission systems embodying a hydraulic coupling and a sliding gear box or dog clutch or the like, and particularly where the hydraulic coupling is of a kind (such as that working with a substantially constant liquid content) which does not completely disengage the driven shaft from the torque of the driving shaft.

When such a transmission system is connected to a source of power, such as an internal combustion engine, which it is inconvenient to stop in order to engage or disengage the drive, it is customary to provide a brake or "clutch stop" to arrest the rotation of the driven shaft of the coupling, while the engine is running, thus permitting the drive to be engaged. When, however, the driven shaft is stopped with the engine running and the drive engaged, it follows that the torque load of the jaw clutch or sliding gear teeth due to the "drag" of the coupling is too great to permit easy disengagement of these teeth—for example in order to allow another gear to be engaged.

Application of the clutch stop brake under such circumstances will not effect any reduction in the torque loading on the jaw clutch or gear teeth, and this brake is therefore of no assistance when it is desired to disengage the drive when the driven shaft is at rest.

An object of the present invention is the provision, in a power transmission system of the kind above referred to, of means for facilitating the disconnection of the drive, whereby the above described difficulty is obviated.

A further object of the invention is the provision of means for facilitating the disconnection of the drive, which means are also capable of serving as a clutch stop brake.

The invention will be described by way of example with reference to the accompanying drawings in which Fig. 1 is a diagrammatic elevation of an automobile chassis provided with a transmission system in accordance with the invention.

Fig. 5 is a sectional plan of an alternative embodiment of the invention, taken on the line 5—5 in Fig. 6.

Fig. 6 is a sectional front elevation on the line 6—6 in Fig. 5.

Figure 1:
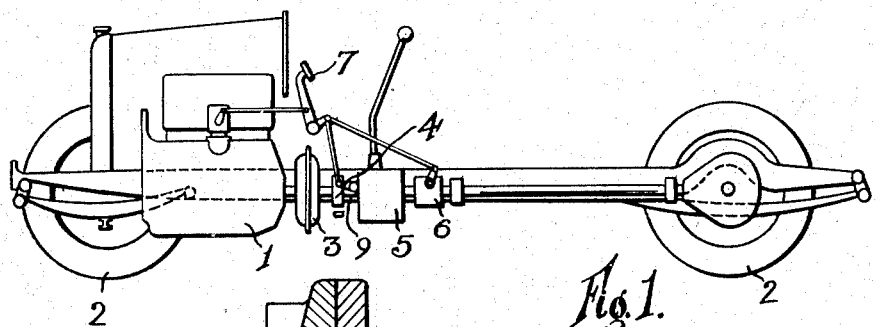

Referring to Fig. 1, the transmission system comprises between the engine 1 and the road wheels 2, in the order named, a hydraulic coupling 3 of the Vulcan, or so-called Föttinger type (the general type disclosed and claimed in the Föttinger Patent 1,199,359, dated Sept. 26, 1916), a drum 4 secured to the transmission shaft 9 between the coupling and gear box and adapted to be braked in a manner to be described later in connection with Figs. 2, 3 and 4 or 5, 6, and 7, a gear box 5 which may be of any known or suitable type, for example the sliding gear type, and a free-wheel device 6. The free-wheel device is preferably of the two-condition type, controlled for example from a foot pedal 7, the arrangement being such that the device is normally locked, and that when the pedal is depressed the device behaves as an ordinary free-wheel permitting drive in one sense only, that is, from the engine to the road wheels. The pedal 7 which controls the free-wheel device is also coupled to the throttle or other means for controlling the power delivered by the engine 1, in such a manner that, when the pedal is fully depressed, the engine is brought to or near its slow running condition irrespective of the setting of the normal power control member.

Braking means for braking the drum 4 on the transmission shaft behind the hydraulic coupling are also connected to the pedal 7. The arrangement is such that as the pedal 7 is depressed by a suitable amount the brake is applied and if the driven element of the coupling 3 is rotating it is thereby brought to rest. Further depression of the pedal 7 serves to rotate the braking means together with the drum 4 in a direction opposite to the direction of rotation of the engine 1 and the driving element of the coupling 3, for the purpose of relieving the transmission behind the brake of torsional load.

Figure 2:
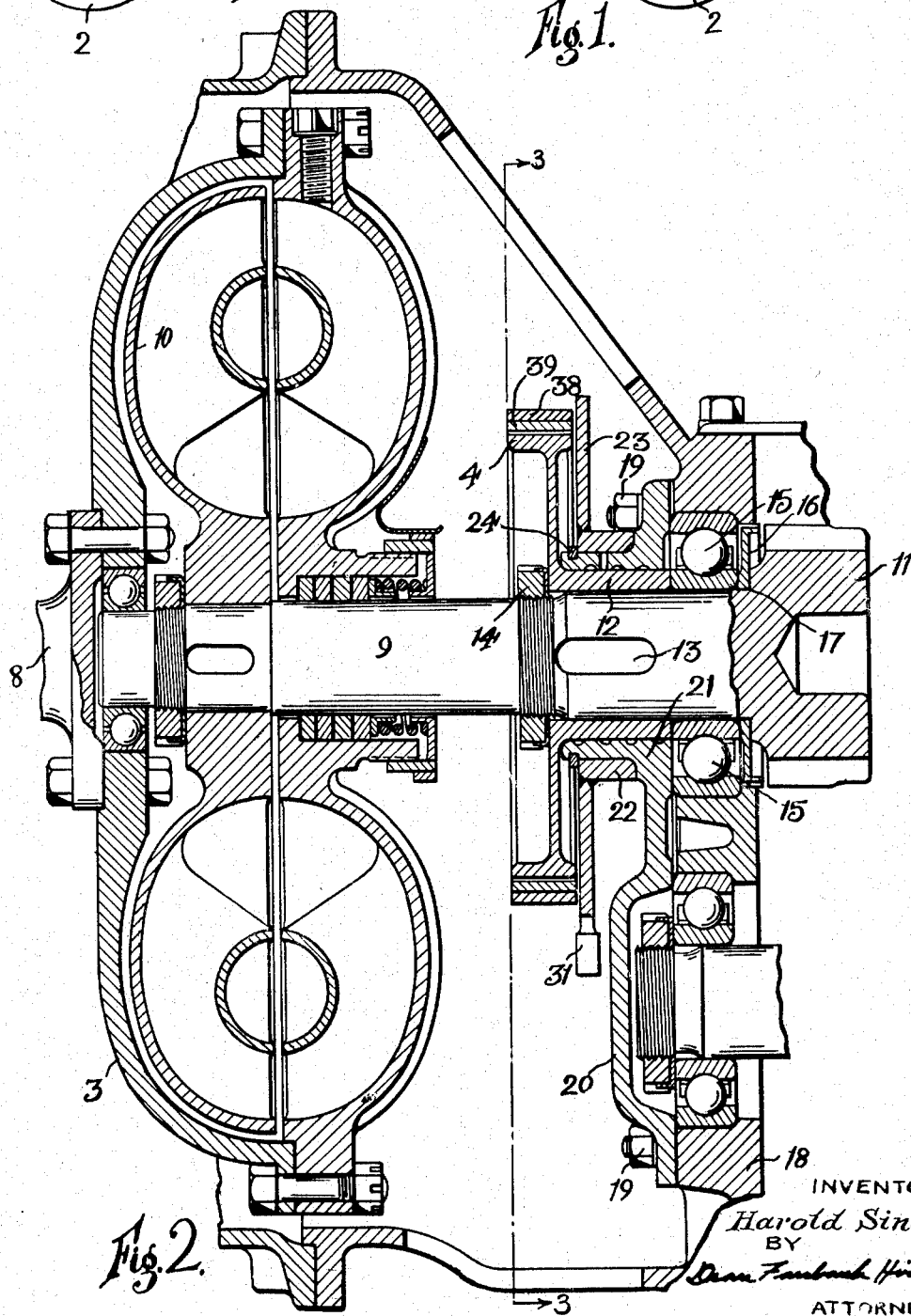
Fig. 2 is a sectional side elevation of an embodiment of the invention as applied to the transmission system of an automobile, such as that shown in Fig. 1, taken on the line 2—2 in Fig. 3.
Figure 3:
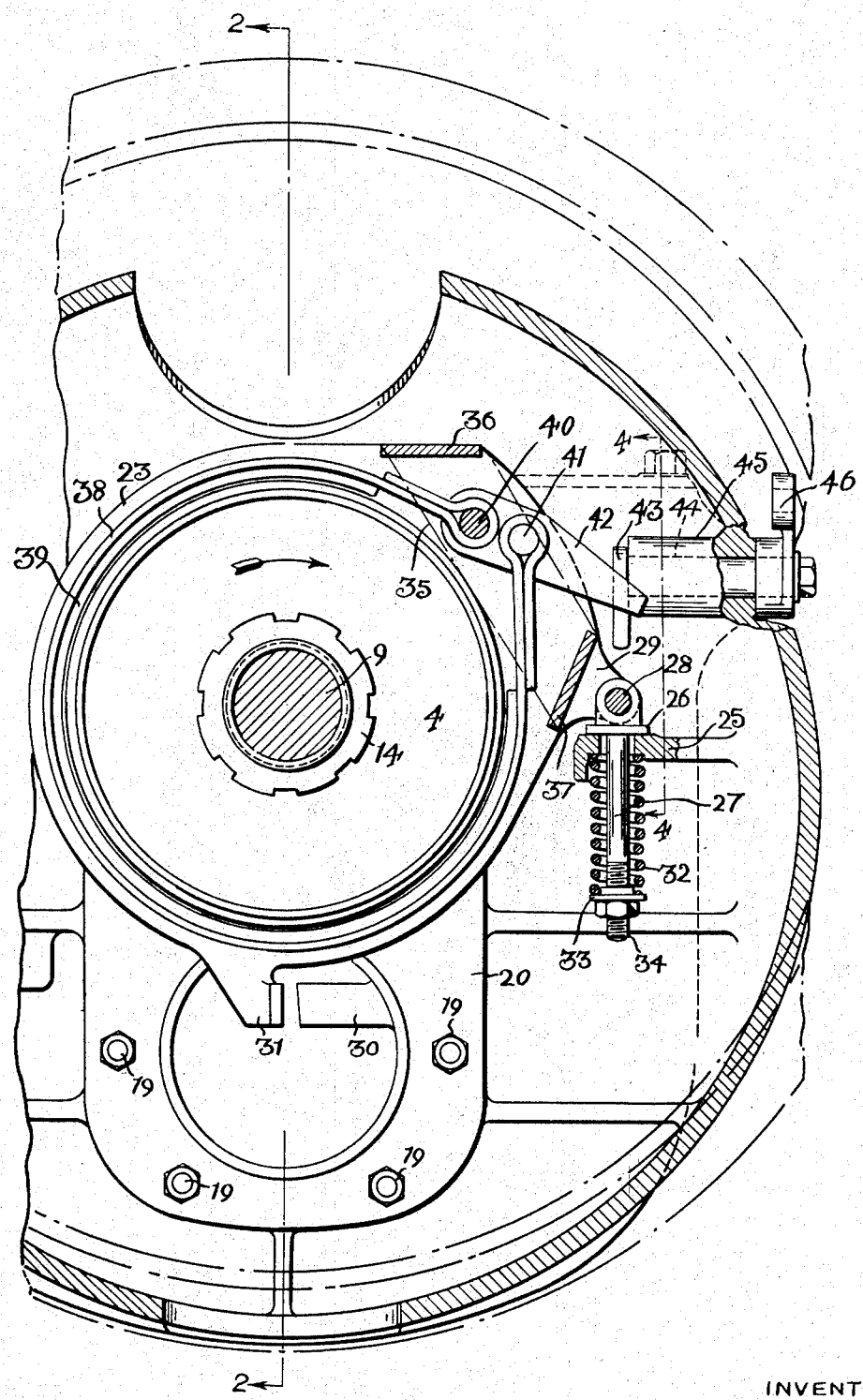
Fig. 3 is a sectional front elevation on the line 3—3 in Fig. 2.
Figure 4:
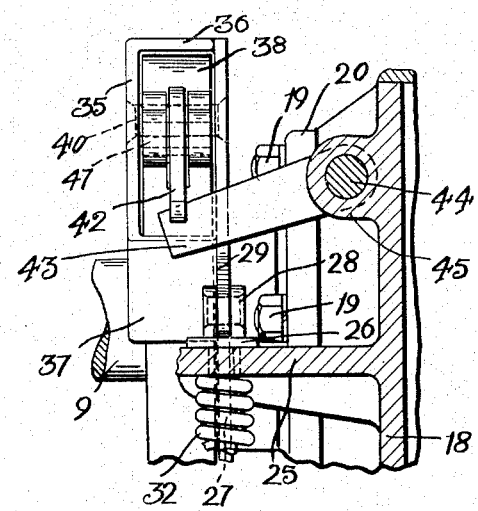
Fig. 4 is a section of a detail on the line 4—4 in Fig. 3.

Referring to Figs. 2, 3 and 4, the engine crank shaft 8 is coupled to the primary shaft 9 of a conventional type of change-speed gear box through a hydraulic coupling 3 of the Vulcan (or so-called Föttinger) type. The front end of the primary shaft 9 is keyed to the driven element 10 of the hydraulic coupling, while the back end of this shaft is formed integral with the driving constant-mesh pinion 11 of the gear box 18. A brake drum 4 is mounted on shaft 9 by means of a boss 12, being secured against rotation relative to the shaft by a key 13 and locked in an axial direction by an internally threaded ring 14 engaging with corresponding threads formed on the shaft 9 and retaining the boss 12, and with it the ball-race 15 and the oil thrower 16, against a shoulder 17 formed on the pinion 11. Attached to the gear box 18 by studs and nuts 19 is a front cover 20 integral with which is a sleeve 21 surrounding the boss 12. A boss 22 to which is welded a plate 23 is mounted on sleeve 21 so that it is free to oscillate thereon but is prevented from moving axially by a ring 24 sprung into a groove in the front end of sleeve 21. The range of oscillation of the rocking plate 23 is limited in a clockwise direction (as viewed in Fig. 3) by a stop 25 formed on the gear box, and adapted to abut against a shoulder 26 formed on an eyebolt 27 pivotally mounted by means of pin 28 passing through a projection 29 on the edge of the rocking plate 23. The range of oscillation of the rocking plate in an anti-clockwise direction is limited by a stop 30 formed on the cover 20 and adapted to abut against a projection 31 on the edge of the rocking plate 23. A helical spring 32 is compressed between the stop 25 and a collar 33 retained on the lower end of the eyebolt 27 by a nut 34, the arrangement being such that the spring tends to retain the plate 23 against the stop 25 limiting its oscillation in a clockwise direction. A bridge piece 35 having backwardly bent ends 36 and 37, is welded to the front of the rocking plate 23 in such a way that the ends of a brake band 38, lined with friction material 39, may pass freely between the bridge piece and the rocking plate. One end of the brake band 38 is pivotally mounted on a pin 40 the ends of which are fitted into holes formed in the bridge piece and rocking plate respectively. The other end of the brake band is pivotally mounted on a pin 41 carried by an actuating lever 42, one end of which is pivotally mounted on the pin 40 and the other end of which is adapted to be engaged by a lever 43 formed on one end of a shaft 44 journalled in a boss 45 formed on the gear box 18. A lever 46, which is keyed to the other end of the shaft 44, is coupled in a suitable manner to the operating pedal or other controlling means 7.

The operation of the braking device is as follows:

In the first case the arrangement may be used in place of a clutch stop such as is commonly provided to reduce the speed of the primary gear box shaft 9 and parts rotating therewith, for example, during changing from a lower to a higher gear. In order to use the device for this purpose the controlling means are employed to move the lever 46 in such a way that the end of the lever 43 is raised, thereby rocking the lever 42 in a counter-clockwise direction about the pin 40. This movement raises the end of the brake band 38 carried by pin 41, and thereby draws the band into contact with the brake drum 4 which is revolving in the direction of the arrow shown in Fig. 3. Friction between the lining 39 and the brake drum 4 reduces the speed of the shaft 9, the brake torque reaction being transmitted by the lever 42, the pins 40 and 41, the rocking plate 23 and bridge piece 35, and the eye bolt 27, to the fixed stop 25.

In the second case the arrangement may be used to rotate the shaft 9 and the parts arranged for rotation positively therewith in a direction opposite to the normal direction of rotation of the engine. In order to use the device for this purpose, the brake band 38 is caused to contract in the same way as described above. If now the control is actuated with sufficient force to overcome the load reacting against the stop 25, the rocking plate 23 will be rocked about the sleeve 21 in a counter-clockwise direction until the projection 31 meets the stop 30. As the counter-clockwise torque is applied to the rocking plate by a force transmitted to the lever 42 by the lever 43 in such a way as to cause the lever 42 to contract the brake band, it is clear that, when the rocking plate 23 is rotated counter-clockwise, the brake drum 4 will be carried round therewith by friction between the material 39 and the drum 4. Thus the shaft 9 will be positively rotated in a direction opposite to the direction of rotation of the engine by means of the force applied to the operating pedal or other controlling device.

Figure 7:
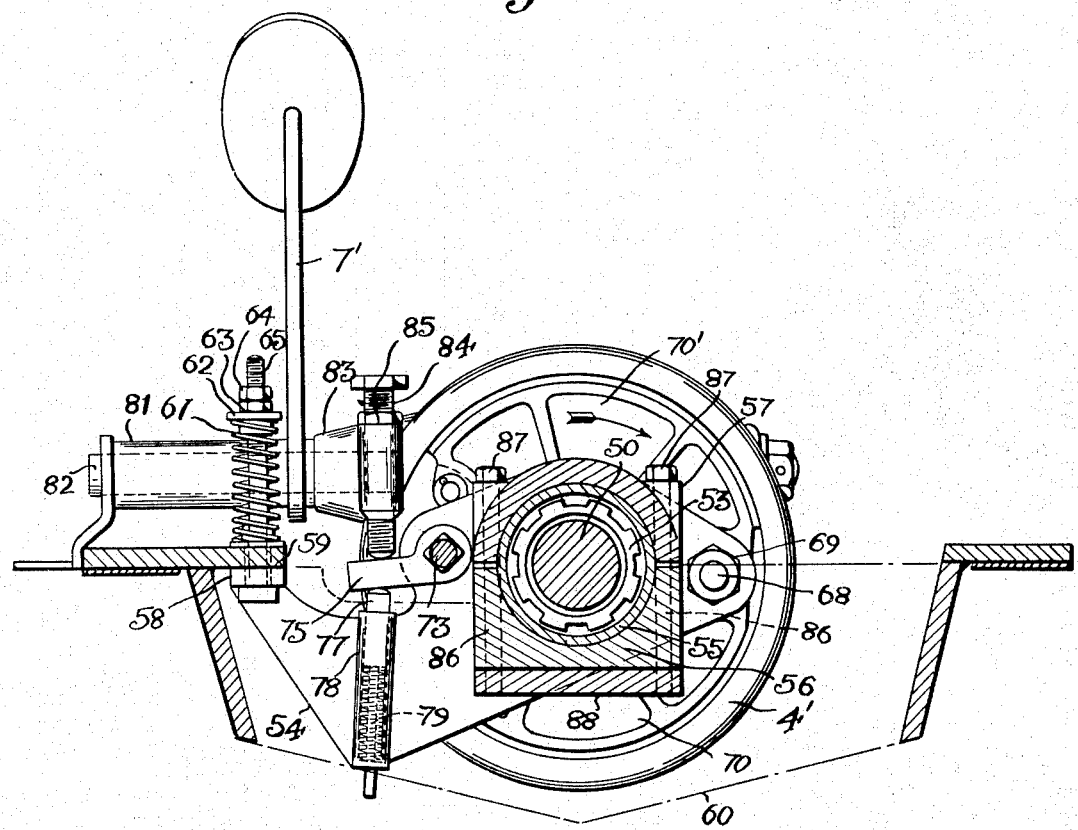
Fig. 7 is a sectional front elevation on the line 7—7 in Fig. 5.

In the alternative embodiment of the present invention shown by way of example in Figs. 5, 6 and 7 as applied to the transmission system of an automobile, such as that illustrated in Fig. 1, a two-shoe internal-expanding brake is employed. The driven element 10' of the hydraulic coupling 3' is fixed by a key and taper to the front end of a shaft 50, the rear end of which is provided with internal splines engaging with the externally-splined forward end of a gear box driving shaft 51. A brake drum 4' is secured to the shaft 50 by a key 52 and a nut 53. The brake shoes are carried, in a manner to be hereinafter described, by a plate 54 welded to a hollow boss 55 carried by a split bearing 56, 57, which is secured by studs 86 and nuts 87 to a thickened part 88 of a cross member 60. A projection 58 on the plate 54 normally abuts against a stop 59 formed on the cross member 60, being held in contact therewith by a spring 61 compressed between the stop 59 and a collar 62 held by nuts 63 and 64 on a screw 65 freely fitted through holes drilled in the stop 59 and the projection 58. Thickening pieces 66 and 67 are welded to the rear of the plate 54. A pin 68, fitted through a hole formed in the plate 54 and secured by a nut 69, serves as a hinge abutment for one end of the brake shoes 70 and 70'. The other ends of the brake shoes are pivotally connected by links 71 and 71' to opposite ends respectively of a two-armed lever 72 formed integral with a shaft 73 journalled in a bush 74 pressed into a hole formed in the plate 54. A lever 75 is fixed by a nut 76 on the squared forward end of the shaft 73. A plunger 77, slidably fitted in a guide 78 welded to the front of the plate 54, is urged upward against the lever 75 by a spring 79. A pedal 7' provided with a boss 81 is journalled on a pedal shaft 82 suitably fixed to the chassis frame. Formed integrally with the pedal 7' is a forwardly projecting lever 83 into the free end of which is threaded a screw 84 locked by a nut 85, the lower end of the screw being adjacent to the upper surface of the lever 75.

This arrangement may be used in the first case for retarding or stopping the shaft 50 when it is rotating normally in the direction of the arrow in Fig. 6. The pedal 7' being in its raised position, the screw 84 is adjusted so as to allow the lever 75 to rise, under the influence of the spring plunger 77, far enough to cause the brake shoes 70 and 70' to be withdrawn out of contact with the drum 4'. When the pedal 7' is partially depressed, the lever 83 is caused to rock downwards so that the lower end of the screw 84 engages the lever 75 and rotates it anti-clockwise as viewed in Fig. 6 with the result that the brake shoes 70 and 70' are forced outwards by the action of the links 71 and 71' and thereby engage the drum 4'. The brake torque reaction is transmitted by the projection 58 to the stop 59.

The arrangement may be used in the second case for imparting to the shaft 50 a slight rotation in the opposite direction to its normal direction of rotation. Assuming that the pedal 7' has been partially depressed, the brake shoes 70 and 70' will have been forced into contact with the drum 4' as described above. The shaft 50 now being at rest, further depression of the pedal 7' causes the end of the lever 75 to be forced further downward. Since the brake shoes have already engaged the brake drum, the shaft 73 is prevented from rotating further in its bush 74, with the result that the downward movement of the lever 83 causes the plate 54 to rotate anti-clockwise (Fig. 6) about the axis of the shaft 50, the boss 55 turning in the bearing 56, 57, and the spring 61 being compressed. Since the brake shoes are carried by the plate 54 and are in engagement with the drum 4', the reverse rotation of the plate 54 is transmitted to the shaft 50. When the pedal 7' is allowed to rise, the torque reaction, together with the spring 61 raise the screw 65 and the projection 58, restoring the plate 54 to its normal position, and the spring 79 raises the plunger 77 and rotates the lever 75, thereby disengaging the brake shoes from the brake drum.

The invention is not limited to the use of the kinds of brakes described above for imparting the reverse rotation to an element of the transmission system, and other suitable means may be employed.

Although the braking device according to the present invention has been described as operated in conjunction with other controls, this is not an essential feature and separate control means, or control means interconnected with controls other than those above described, may be used.

In Fig. 1 the pedal 7 is shown connected to the throttle and also to the free-wheel device. The present invention, so far as it involves these features and the specific mechanism used in connection therewith, is disclosed more in detail and is claimed in my companion application Serial No. 563,788, filed on even date herewith.

The present invention is applicable to a variety of different transmission systems, for example the systems which are described in my co-pending application above referred to.

Although the invention has been described by way of example as applied to the transmission system of a road vehicle, it is to be understood that it may be applied in many other mechanisms, for example, in railway locomotives, and rail cars, tanks, excavators, and cranes.

I declare that what I claim is:—

1. A power transmission system comprising a hydraulic coupling having a driving element and a driven element and capable of transmitting torque while slipping, a driven shaft, means for disconnecting the transmission system between said driven coupling element and said driven shaft, a control member, and means, which, while said disconnecting means are not disconnected, while said driving element is rotating, and while said driven shaft is stalled, can be operated by said control member to engage a rotatable element of the system between said driven coupling element and said disconnecting means and to impart to said rotatable element a rotation in a direction opposite to its normal direction of rotation.

2. In a transmission mechanism of the type including a hydraulic torque transmitter having an input element and an output element, a change speed gearing, the input shaft of which is connected to said output element, a brake drum mounted for rotation positively with said input shaft, and braking means cooperating with said brake drum, the combination with said braking means of a member which supports said braking means and which is capable of rotation about the axis of said drum, and control means for moving said braking means into contact with said brake drum and thereafter imparting to said support member and through said braking means to said drum a limited reverse rotation, so as to eliminate torque loading imposed on said gearing due to said hydraulic coupling when said output element is stalled.

3. In a transmission mechanism of the type including a hydraulic torque transmitter having an input element and an output element, a change speed gearing driven by said output element, a brake drum mounted for rotation positively with the output shaft of said torque transmitter and a brake band cooperating with said brake drum, the combination with said brake band, of a member which supports said brake band and which is capable of rotation about the axis of said drum, and control means for moving said brake band into contact with said brake drum and thereafter imparting to said support member and through said band to said drum a limited reverse rotation so as to eliminate torque loading imposed on said gearing due to said hydraulic transmitter when said output element is stalled.

4. A power transmission system comprising a hydraulic coupling having a driving member and a driven member, a control member, means actuated by said control member for engaging an element connected for rotation with said driven member, and bringing said driven member to rest while said driving member is still rotating, and means which can be energized by said control member after said driven member has come to rest to impart to said first mentioned means a rotation in a direction opposite to the normal direction of rotation of said engaged element.

5. A power transmission system comprising an output shaft, a hydraulic slippable coupling for transmitting power to said shaft and having a driven element, drive disconnecting means having a pair of cooperating and disengageable toothed members drivably connected with said driven element and said output shaft respectively, rotatably mounted means for engaging a part of the system connected for rotation with said driven element, and a control member operable to cause said second mentioned means to engage said rotatable part, rotate in a reverse direction, and thus to impart a similar rotation to said driven element, this rotation serving when the output element is stalled to eliminate torque loading imposed on said toothed members through said hydraulic coupling.

6. A power transmission system comprising an input shaft, an output shaft, means for disconnecting the drive between said shafts, said means having two cooperating rotatable toothed elements drivably connected to said shafts respectively, a control member, and means movable about the axis of a part of the system connected for rotation with said driven element and associated with stops serving to limit its range of movement, said means being operable by said control member, when said toothed elements are not rotating, but when torque loading exists in said system, to engage said part of the system and to impart thereby to said driving element a reverse rotation of predetermined small amount so as to eliminate torque loading on said toothed elements.

7. In combination, a hydraulic coupling having a rotatable driving element and a rotatable driven element and capable of transmitting torque while permitting slip between said elements, a control member, and means capable of angular displacement about the axis of rotation of said driven element and operable by said control member for engaging said driven element and imparting thereto a limited rotation in a direction opposite to the normal direction of rotation of said driving element.

8. In combination, a hydraulic power transmitter of the kinetic type having a rotatable impeller element and a rotatable runner element, a brakable member mounted for rotation positively with said runner element, braking means cooperating with said brakable member and capable of angular displacement about the axis of rotation of said brakable member, and control means for moving said braking means into contact with said brakable member and thereafter imparting through said braking means to said brakable member a limited rotation in a direction opposite to the normal direction of rotation of said impeller element.

9. In combination, a hydraulic coupling of the kinetic type having a rotatable input element and a rotatable output element, a brake drum mounted for rotation positively with said output element, a brake band cooperating with said brake drum, an anchorage for said band, which is movable circumferentially about said drum and control means for moving said brake band into contact with said brake drum and thereafter imparting through said band to said drum a limited rotation in a direction opposite to the normal direction of rotation of said input element.

10. In a power transmission system, a rotatable transmission element, a brakable member drivably connected to said transmission element, braking means cooperating with said brakable member, a bracket for carrying said braking means, said bracket being so mounted as to be capable of limited displacement in a plane normal to the axis of rotation of said brakable member, a control member, and means operable by said control member for moving said braking means into contact with said brakable member and thereafter displacing said bracket so as to impart through said brakable member to said transmission element a limited rotation.

11. In a power transmission system a brake drum positively connected to a rotatable element of said system, a braking element cooperating with said brake drum, a member for carrying said braking element and having a limited range of rocking about the axis of said drum, means mounted on said carrying member for moving said braking element into contact with said drum, and a control member for engaging and actuating said means for moving said braking element, motion of the engaging portion of said control member to engage the brake taking place in a direction which is substantially tangential to a circle concentric with, and contained in a plane perpendicular to, the axis of said drum, and which is contrary to the normal direction of motion of the adjacent part of said drum.

12. A power transmission system comprising an input shaft, an output shaft, means for disengaging the drive between said shafts, a friction brake having a brakable element connected for rotation with said input shaft and a braking element capable of being moved about the axis of rotation of said brakable element, means for engaging said braking element with said brakable element, and a control member connected with said engaging means and operable firstly to apply said brake and thereafter to impart to said input shaft through said brake elements a rotation in a direction opposite to its normal direction of rotation.

13. A power transmission system comprising an input shaft, an output shaft, means for disengaging the drive between said shafts, an engageable element connected for rotation with one of said shafts, and an engaging element capable of angular displacement about the axis of rotation of said engageable element, means operable for bringing the said two elements into engagement, a control member connected with said engaging means and operable to firstly engage the said two elements together and thereafter to impart angular displacement to said engaging element and through said engageable element to the shaft connected therewith, and means which, when the said two elements are disengaged, automatically return said engaging element to its initial position.

14. A power transmission system comprising a driving shaft, a driven shaft, means for disconnecting the drive between said shafts and which are of the kind that resist disengagement when under torque load, a control member, a brakable element connected for rotation with said driving shaft, a braking element capable of being rotated about the axis of rotation of said brakable element, and an operative connection between said control member and said braking element which serves, on operation of said control member, to engage said braking element with said brakable element and to impart to both of said elements and to said driving shaft a rotating serving, when the system is stalled under torque load, to eliminate torque load from said disconnecting means.

15. A power transmission system comprising an input shaft, an output shaft, means for disconnecting the drive between said shafts, said means having cooperating toothed members slidable relatively to each other and connected to said shafts respectively, a friction brake having a brakable element connected for rotation with said driving toothed member, a braking element, and a support for said braking element, said support being capable of rotation about the axis of said brakable element, means for engaging said brake, a control member, and an operative connection between said control member, said engaging means, and said support, which serves, on operation of said control member, to engage said brake and thereafter to impart to said support a rotation in a direction opposite to the normal direction of rotation of said brakable element.

16. A power transmission system comprising a hydraulic slippable coupling having a driven element, a driven shaft, drive-disconnecting means which serve to couple said driven element to said driven shaft, a transmission element connected for rotation with said driven coupling element, a control member, an abutment, and, associated with said abutment means capable of being moved about the axis of said transmission element and operable by said control member for engaging said transmission element and imparting thereto a rotation in a direction opposite to its normal direction of rotation, operation of said control member when said driven shaft is stalled serving to eliminate from said drive-disconnecting means the torque transmitted by said hydraulic coupling and to transfer this torque to said abutment.

17. In a transmission mechanism of the type including a prime mover, a change-speed gearing and a hydraulic coupling capable of slipping while transmitting torque and having a driving element connected to said prime mover and a driven element connected to the input shaft of said change-speed gearing, the combination with said driven element and said input shaft of a control member and means capable of rotation about the axis of a transmission element between said driven element and said gearing and operable by said control member to engage said transmission element and to impart a reverse rotation thereto, which rotation serves to eliminate torque loading imposed on said gearing by said hydraulic coupling when the transmission is stalled.

18. A power transmission system comprising a driving element arranged to rotate normally in only one direction, a rotatable driven element, drivably connecting said elements, a clutch device which resists disengagement when transmitting torque, a rotatably mounted support, means carried by said support and capable of being moved relatively thereto so as to engage a part of the transmission system rotatable with said driving element, and a control member, which, when said system is under torque load and said driven element is stalled, can be operated to move said engaging means into contact with said transmission part and thereafter to rotate said engaging means together with said support and said transmission part in a reverse direction for the purpose of removing torque loading from said clutch device.

19. A power transmission system comprising a driving element arranged to rotate normally in only one direction, a rotatable driven element, means for disconnecting the drive between said elements and which resist disengagement when under torque load, a brake for preventing the rotation of said driving element and having a braking element capable of angular displacement about the axis of the brakable element thereof, a stop for limiting the rotation of said braking element in the normal direction of rotation of said brakable element, means which tend to maintain said braking element engaged with said stop, and a control member which is operatively connected with said braking element and which on initial operation engages said braking element with said brakable element and on further operation imparts to said braking element and thence to said driving element a reverse rotation which serves to eliminate torque loading on said disconnecting means when said driven element is stalled.

HAROLD SINCLAIR.